J. L. LA COUR.
DYNAMO ELECTRIC MACHINE.
APPLICATION FILED OCT. 7, 1915.
1,284,370.
Patented Nov. 12, 1918.
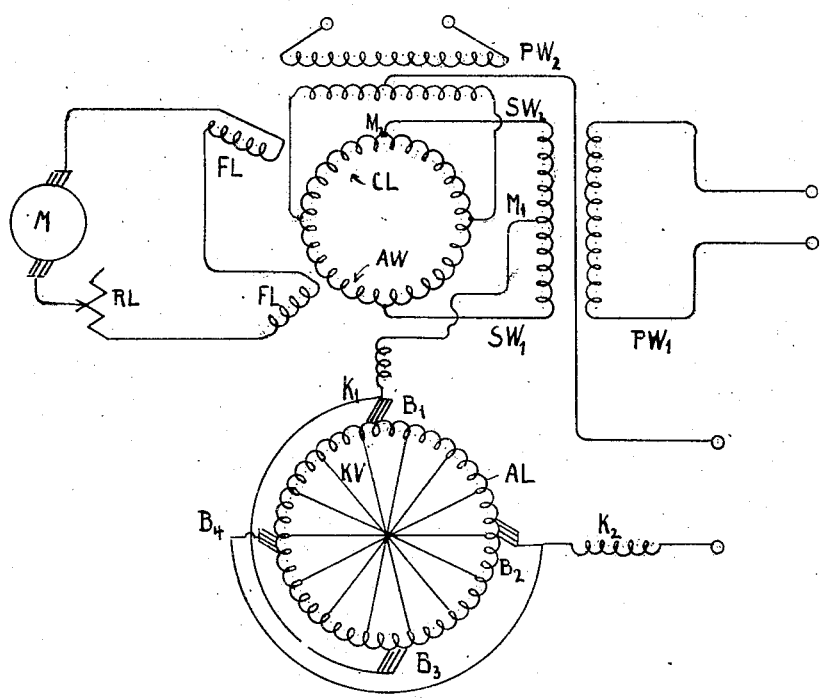
Inventor
Jens L. la Cour
by [signature]
atty

UNITED STATES PATENT OFFICE.

JENS LASSEN LA COUR, OF CHRISTIANIA, NORWAY.

DYNAMO-ELECTRIC MACHINE.

1,284,370.   Specification of Letters Patent.   Patented Nov. 12, 1918.

Application filed October 7, 1915. Serial No. 54,670.

*To all whom it may concern:*

Be it known that I, JENS LASSEN LA COUR, a subject of the King of Sweden, residing at Christiania, Norway, have invented certain new and useful Improvements in Dynamo-Electric Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It has been proposed to arrange a single machine for operation upon both an alternating-current and upon a direct-current, the machine having different pole numbers for alternating and direct currents. It has also been proposed to provide the rotor of such a machine with quite a special type of rotor-winding, which at the same time serves as armature-winding for the direct-current and as short-circuited secondary-winding for the alternating-current.

The stator of this machine is provided with two windings of which one is the primary winding of the alternating-current and the other the field-winding of the direct-current. The disadvantage of such a machine is that the rotor-winding is quite a special type of winding each armature coil forming a closed secondary winding for the alternating-current. This makes the machine rather complicated. The object of this invention is to arrange the rotor-winding of above described double pole machine as quite a normal direct-current winding, provided with equipotential connections. When there are provided for the direct current twice as many poles as for the alternating-current, the equipotential connections of the rotor-winding will serve as short-circuit-connections for the alternating-current and the rotor-winding will be at the same time an armature-winding for the direct-current and a short-circuited secondary-winding for the alternating-current.

Another improvement of this above described double pole machine is that the primary-winding for the alternating-current is at the same time a compensation-winding for the direct-current armature-winding.

The drawing illustrates how a single machine may operate as a four pole direct-current machine and as a two pole alternating-current machine, according to this invention.

AL is the armature-winding for the direct-current machine and is quite a normal four pole direct-current winding provided with equipotential-connections KV. $B_1$ $B_2$ $B_3$ $B_4$ are the brushes of the direct-current machine, sliding on a commutator in the normal way.

FL is the direct-current field-winding, M is the exciter and RL the resistance for the regulator of the direct current field.

AW is the primary-winding for the alternating-current and is arranged as a closed winding. In this case AW has two phases and the alternating current is supplied by a two-phase transformer with the primary-windings $PW_1$ $PW_2$ and the secondary-windings $SW_1$ $SW_2$.

Now the winding AW serves at the same time as a compensating-winding for the direct-current which flows through AW over the tappings $M_1$ $M_2$ in the middle of the secondary transformer windings. The direct-current will flow through the transformer windings and the winding AW quite independent of the alternating-current one being superposed upon the other. $K_1$ and $K_2$ are the commutating pole windings of the direct-current machine.

Claims:

1. A dynamo-electric machine adapted to operate upon both alternating and direct currents and to serve as a motor-generator or as a generator of alternating and direct currents, comprising a stator provided with a multipolar field winding for direct current, and a closed coil winding provided with taps for connection to a source of polyphase alternating currents to produce a pole number different from that of said multipolar winding, said windings being mutually non-inductive, a rotor provided with a direct-current armature winding having a commutator and brushes bearing thereon, means for supplying direct current from said brushes to said closed coil stator winding to produce therein a magneto-motive force to neutralize that of the direct current armature, and cross-connections on the armature at equipotential points with respect to the direct current which adapt said armature winding to serve as a short-circuited rotor winding for the polyphase stator winding, whereby said closed coil stator winding may serve as a primary winding for the alternating current and as a compensating winding for the direct current armature, and the rotor winding may serve as an armature winding for the direct current and as a short-circuited winding for the alternating current primary winding.

2. A dynamo-electric machine adapted to operate upon both alternating and direct currents and to serve as a motor-generator or as a generator of alternating and direct currents, comprising a stator provided with a multipolar field winding for direct current, and a closed coil winding provided with taps for connection to a source of polyphase alternating currents to produce a pole number different from that of said multipolar winding, said windings being mutually non-inductive, a rotor provided with a winding having a commutator and brushes bearing thereon and connected to form short circuits for the alternating currents in said closed coil stator winding and which are at equi-potential points with respect to the direct current field winding and also to form circuits through said brushes corresponding with the pole number of said direct current winding and to constitute the armature therefor, said brushes being connected to points in said closed coil winding on the axes of the brushes, whereby said closed coil stator winding may serve as a primary winding for the alternating current and as a compensating winding for the direct current armature, and the rotor winding may serve as an armature winding for the direct current and as a short-circuited winding for the alternating current primary winding.

3. A dynamo-electric machine adapted to operate upon both alternating and direct currents and to serve as a motor-generator or as a generator of alternating and direct currents, comprising a stator provided with a winding adapted to form a four polar field, and also with a closed winding, two-phase transformer windings connected to said closed winding to form a two pole alternating current field, said field windings being mutually non-inductive, a rotor provided with a direct current armature winding provided with a commutator and having brushes bearing thereon to form circuits coöperating with said four polar field, a connection from the brushes for one pair of poles to the middle point of one transformer winding, a connection from the middle point of the other phase transformer winding to one of the direct current supply leads, the other direct current supply lead being connected to the brushes for the other pair of poles, the transformer connections to said closed coil stator winding being coaxial with the axes of commutation defined by the brushes bearing upon said commutator, and cross-connections on the armature at equipotential points with respect to the direct current which adapt the armature winding to serve as a short-circuited rotor for the alternating currents, whereby said closed coil stator winding may serve as a primary winding for the alternating current and as a compensating winding for the direct current armature, and the rotor winding may serve as an armature winding for the direct current and as a short-circuited winding for the alternating current primary winding.

In testimony that I claim the foregoing as my invention, I have signed my name in presence of two subscribing witnesses.

JENS LASSEN la COUR.

Witnesses:
M. E. GUTHORSUSEY,
THOS. AERY.

Copies of this patent may be obtained for five cents each, by addressing the "Commissioner of Patents, Washington, D. C."